United States Patent [19]
Simmons

[11] Patent Number: 5,868,657
[45] Date of Patent: Feb. 9, 1999

[54] CUSHIONING CONVERSION SYSTEM WITH ACCUMULATOR CONVEYOR

[75] Inventor: James A. Simmons, Painesville Township, Ohio

[73] Assignee: Ranpak Corp., Concord Township, Ohio

[21] Appl. No.: 951,277

[22] Filed: Oct. 16, 1997

Related U.S. Application Data

[63] Continuation of Ser. No. 486,863, Jun. 7, 1995, abandoned.

[51] Int. Cl.$^6$ ............................. B31B 1/00; B05B 1/14
[52] U.S. Cl. ............................. 493/12; 493/14; 493/23; 493/27; 493/29; 493/967; 198/459.7; 198/460.1
[58] Field of Search ........................ 198/459.7, 463.6, 198/460.1, 464.4; 493/3, 12, 13, 14, 17, 18, 19, 20, 22, 25, 27, 29, 33, 464, 23, 967; 83/155, 63, 61, 73

[56] References Cited

U.S. PATENT DOCUMENTS

| | | | |
|---|---|---|---|
| 2,101,170 | 12/1937 | Engel . | |
| 3,251,452 | 5/1966 | Conway | 198/460 |
| 3,266,794 | 8/1966 | Weir . | |
| 3,426,635 | 2/1969 | Nicklasson . | |
| 3,621,981 | 11/1971 | Nimmo | 198/460 |
| 3,695,133 | 10/1972 | Finke . | |
| 3,820,648 | 6/1974 | Halvorsen | 198/460 |
| 3,899,166 | 8/1975 | Behn . | |
| 4,008,796 | 2/1977 | Aylon | 198/460 |
| 4,026,198 | 5/1977 | Ottaviano . | |
| 4,085,662 | 4/1978 | Ottaviano . | |
| 4,120,393 | 10/1978 | Motooka et al. | 198/460 |
| 4,231,465 | 11/1980 | Bourgeois | 198/460 |
| 4,237,776 | 12/1980 | Ottaviano . | |
| 4,261,456 | 4/1981 | Scarpa | 198/460 |
| 4,355,712 | 10/1982 | Bruno | 198/460 |
| 4,385,537 | 5/1983 | Wolf | 83/100 |
| 4,488,846 | 12/1984 | Halberschmidt | 414/152 |
| 4,588,884 | 5/1986 | Priscott | 250/223 R |
| 4,619,635 | 10/1986 | Ottaviano | 493/36 |
| 4,925,005 | 5/1990 | Keller | 198/460 |
| 4,987,809 | 1/1991 | Price | 53/27 |
| 5,008,842 | 4/1991 | Nagi et al. | 364/551.01 |
| 5,092,450 | 3/1992 | Schommartz | 198/460 |
| 5,097,939 | 3/1992 | Shanklin | 198/419.2 |
| 5,123,889 | 6/1992 | Armington et al. | 493/352 |
| 5,285,887 | 2/1994 | Hall | 198/460 |
| 5,292,238 | 3/1994 | Michalak | 425/9 |
| 5,487,717 | 1/1996 | Tekavec et al. | 493/352 |

*Primary Examiner*—John Sipos
*Assistant Examiner*—Christopher W. Day
*Attorney, Agent, or Firm*—Renner, Otto, Boisselle & Sklar, P.L.L.

[57] ABSTRACT

A cushioning conversion system includes a cushioning conversion machine which converts stock paper into a plurality of cut pads, and a conveyor system positioned to receive pads produced by the cushioning conversion machine and including a conveyor which conveys the pads away from the machine and at least one moveable gate having an open position allowing a pad to pass therethrough and a closed position for stopping progress of a pad along the conveyor when there is insufficient space on the conveyor downstream of the gate to permit a pad to progress substantially through the gate.

7 Claims, 10 Drawing Sheets

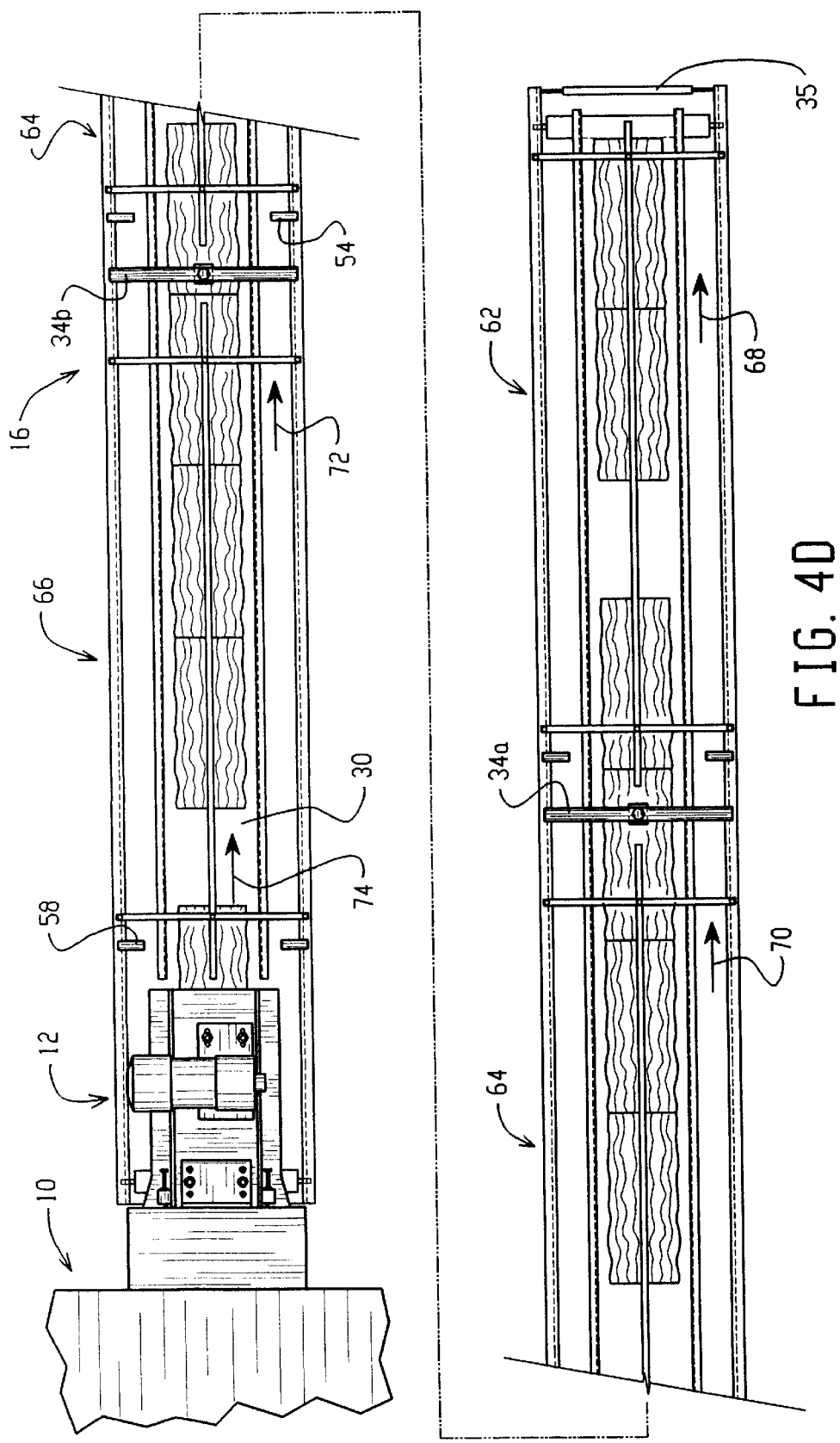

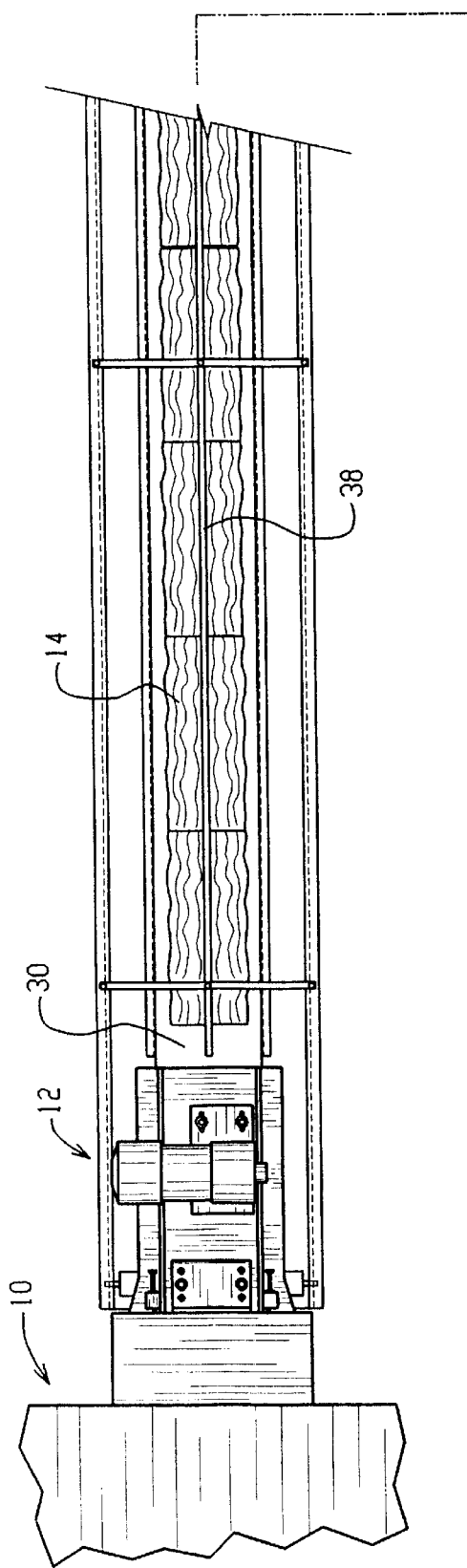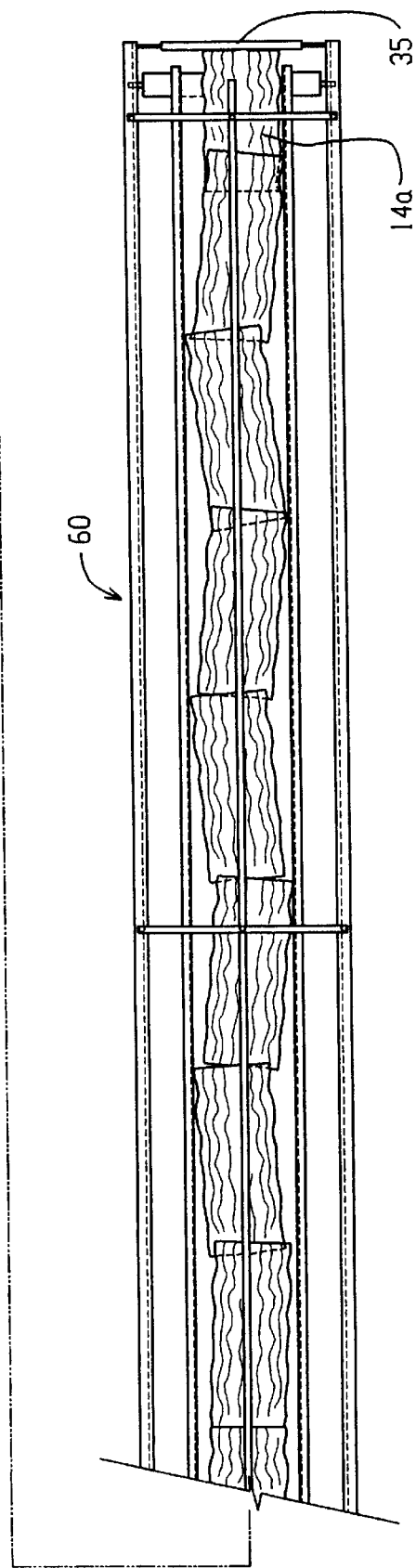
FIG. 5

CUSHIONING CONVERSION SYSTEM WITH ACCUMULATOR CONVEYOR

This is a continuation of application(s) Ser. No. 08/486,863 filed on Jun. 7, 1995 now abandoned.

FIELD OF THE INVENTION

This invention relates generally to a cushioning conversion machine which converts paper stock into cushioning material, and more particularly, to a cushioning conversion machine an outlet conveyor and an assembly for preventing accumulating pads from nesting becoming damaged or causing jamming of the cushioning conversion machine.

BACKGROUND OF THE INVENTION

In the process of shipping an item from one location to another, a protective packaging material is typically placed in the shipping container to fill any voids and/or to cushion the item during the shipping process. Some commonly used protective packaging materials are plastic foam peanuts and plastic bubble pack. While these conventional plastic materials seem to perform adequately as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

These and other disadvantages of conventional plastic packaging materials have made paper protective packaging material a very popular alternative. Paper is biodegradable, recyclable and renewable; making it an environmentally responsible choice for conscientious companies.

While paper in sheet form could possibly be used as a protective packaging material, it is usually preferable to convert the sheets of paper into a low density cushioning product. This conversion may be accomplished by a cushioning conversion machine, such as those disclosed in U.S. Pat. Nos. 4,026,198; 4,085,662; 4,109,040; 4,237,776; 4,557,716; 4,650,456; 4,717,613; 4,750,896; and 4,968,291. (These patents are all assigned to the assignee of the present invention and their entire disclosures are hereby incorporated by reference.) Such a cushioning conversion machine converts sheet-like stock material, such as paper in multi-ply form, into low density cushioning pads or dunnage.

A cushioning conversion machine, such as those disclosed in the above-identified patents, may include a stock supply assembly, a forming assembly, a gear assembly, and a cutting assembly, all of which are mounted on the machine's frame. During operation of such a cushioning conversion machine, the stock supply assembly supplies the stock material to the forming assembly. The forming assembly causes inward rolling of the lateral edges of the sheet-like stock material to form a continuous strip having lateral pillow-like portions and a thin central band. The gear assembly, powered by a feed motor, pulls the stock material through the machine and also coins the central band of the continuous strip to form a coined strip. The coined strip travels downstream to the cutting assembly which cuts the coined strip into pads of a desired length.

Typically, the cut pad is transferred downstream to a transitional zone, such as a table, a conveyor, a bin, etc., and is thereafter removed from the transitional zone and inserted within a container for cushioning purposes. In the past, the transitional zone has been positioned beneath the cutting assembly whereby gravity caused the pad to fall towards the transitional zone, or, in other words, away from the cutting assembly. Additionally or alternatively, the approaching coined strip would urge the cut pad in this direction.

The practice of depending upon the force of gravity and/or the urging of the approaching strip for pad-transferring purposes has, for the most part, been very successful. Nevertheless, applicant appreciated that in certain circumstances (such as high/constant volume cushioning situations), pad-transfer problems sometimes, albeit very rarely, occurred. For example, because of the lightweight nature of the pad, one would occasionally fail to travel downstream to the transitional zone. While, in most instances, the approaching pads would eradicate this failure by pushing the "stalled" pad downstream, periodically the approaching pads would instead "shingle" (i.e., the pads would stack one on top of the other in a shingle-like arrangement). Such shingling (although itself uncommon) would usually result in the "jamming" the cushioning conversion machine and this jamming would almost always translate into machine downtime.

Further, problems could arise from the accumulation of a large number of pads in the transitional zone, such as on a conveyor. While the use of a conveyor generally works well in conveying formed pads away from the cushioning conversion machine, if the conveyor were to become filled with pads, the pads would tend to nest or shingle resulting in the difficult removal of the pads from the conveyor and possible damage to the pads.

SUMMARY OF THE INVENTION

The present invention provides a cushioning conversion system including a cushioning conversion machine and a conveyor system which conveys pads away from the machine while preventing pads from becoming nested or forced together. The conveyor system includes a series of stop gates which permit a pad to pass by when there is sufficient space for the pad on the conveyor downstream of the stop gate and which stops the progress of the pad along the conveyor when there is insufficient space for the pad. Each stop gate is preferably controlled by an associated sensor located downstream of the gate. A sensor may also be used to determine and communicate to the cushioning conversion machine that there is insufficient space on the conveyor for a new pad, whereupon the machine can discontinue its production of pads until space is available thereby decreasing the potential for jams in the machine.

In accordance with one aspect of the invention, a cushioning conversion system includes a cushioning conversion machine which converts stock paper into a plurality of cut pads, and a conveyor system positioned to receive pads produced by the cushioning conversion machine and including a conveyor which conveys the pads away from the machine and at least one moveable gate having an open position allowing a pad to pass therethrough and a closed position for stopping progress of a pad along the conveyor when there is insufficient space on the conveyor downstream of the gate to permit a pad to progress substantially through the gate.

In accordance with a further aspect of the invention, a cushioning conversion system includes a cushioning conversion machine which converts stock paper into a plurality of cut pads, and a conveyor system positioned to receive pads produced by the cushioning conversion machine and including a conveyor which conveys the pads away from the machine and at least one moveable gate having an open position allowing a pad to pass therethrough and a closed position for stopping progress of a pad along the conveyor.

In accordance with a still further aspect of the invention, a cushioning conversion system includes a reversible conveyor system, and a cushioning conversion machine located at each end of the reversible conveyor system, each machine for selectively converting stock paper into a plurality of cut pads and depositing the pads on the conveyor system when active, the reversible conveyor system including a conveyor which conveys the pads away from the active machine and at least one moveable gate having an open position allowing a pad to pass therethrough and a closed position for stopping progress of a pad along the conveyor.

In general, the invention comprises the foregoing and other features hereinafter fully described and particularly pointed out in the claims, the following description and the annexed drawings setting forth in detail a certain illustrated embodiment of the invention, this being indicative, however, of but one of the various ways in which the principles of the invention may be employed.

BRIEF DESCRIPTION OF THE DRAWINGS

In the annexed drawings:

FIGS. 4A through 4D are top views of the conveyor system of FIG. 1 illustrating the progression of pads along the conveyor;

FIG. 5 is a top view of an ordinary conveyor system illustrating the shingling and nesting problems associated with such a conveyor;

DETAILED DESCRIPTION OF THE INVENTION

Figure 1:
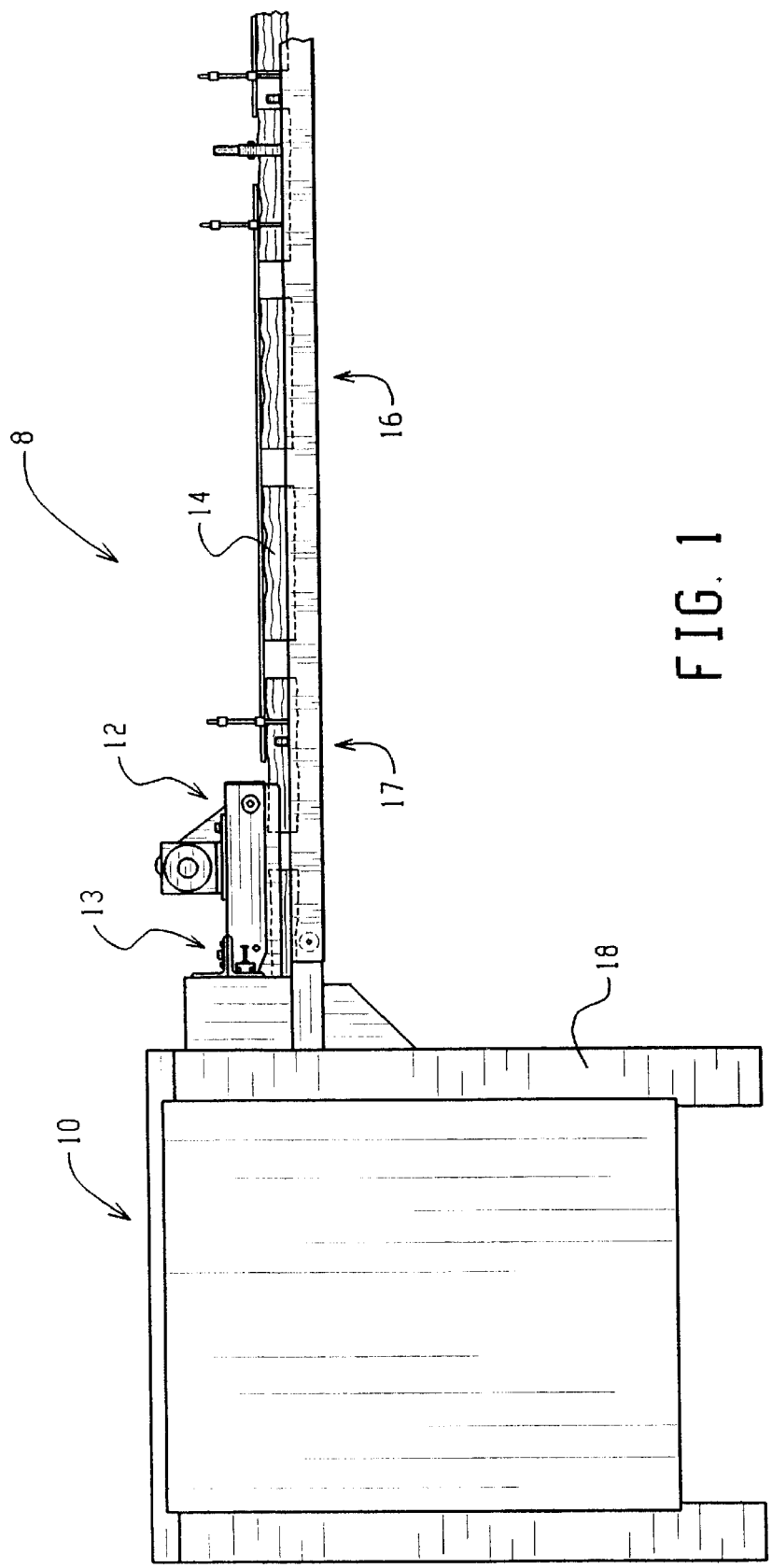
FIG. 1 is an elevation view of a cushioning conversion machine including the conveyor system of the present invention.
Figure 2:
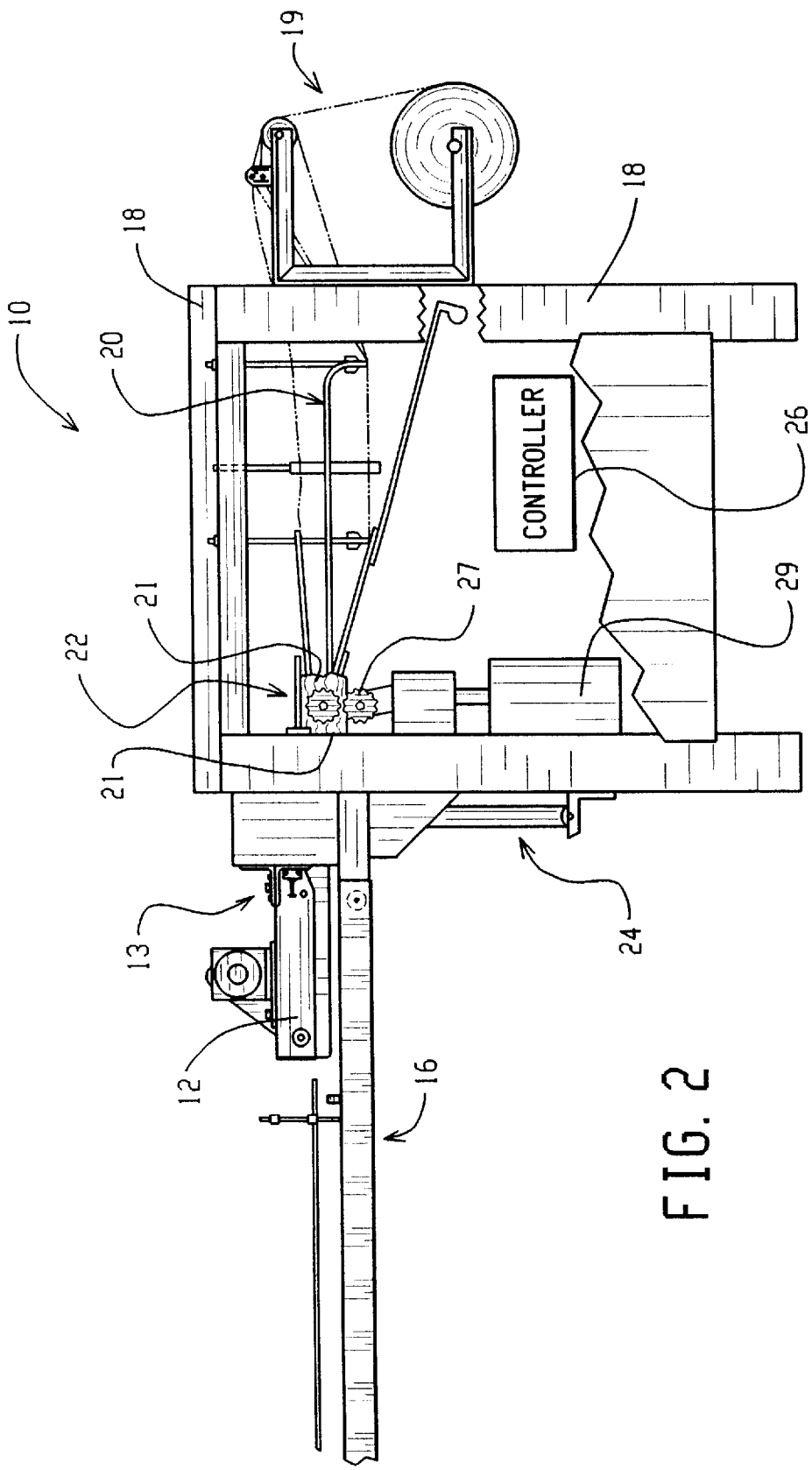
FIG. 2 is a cutaway view of the opposite side of the cushioning conversion machine of FIG. 1.
Figure 3:
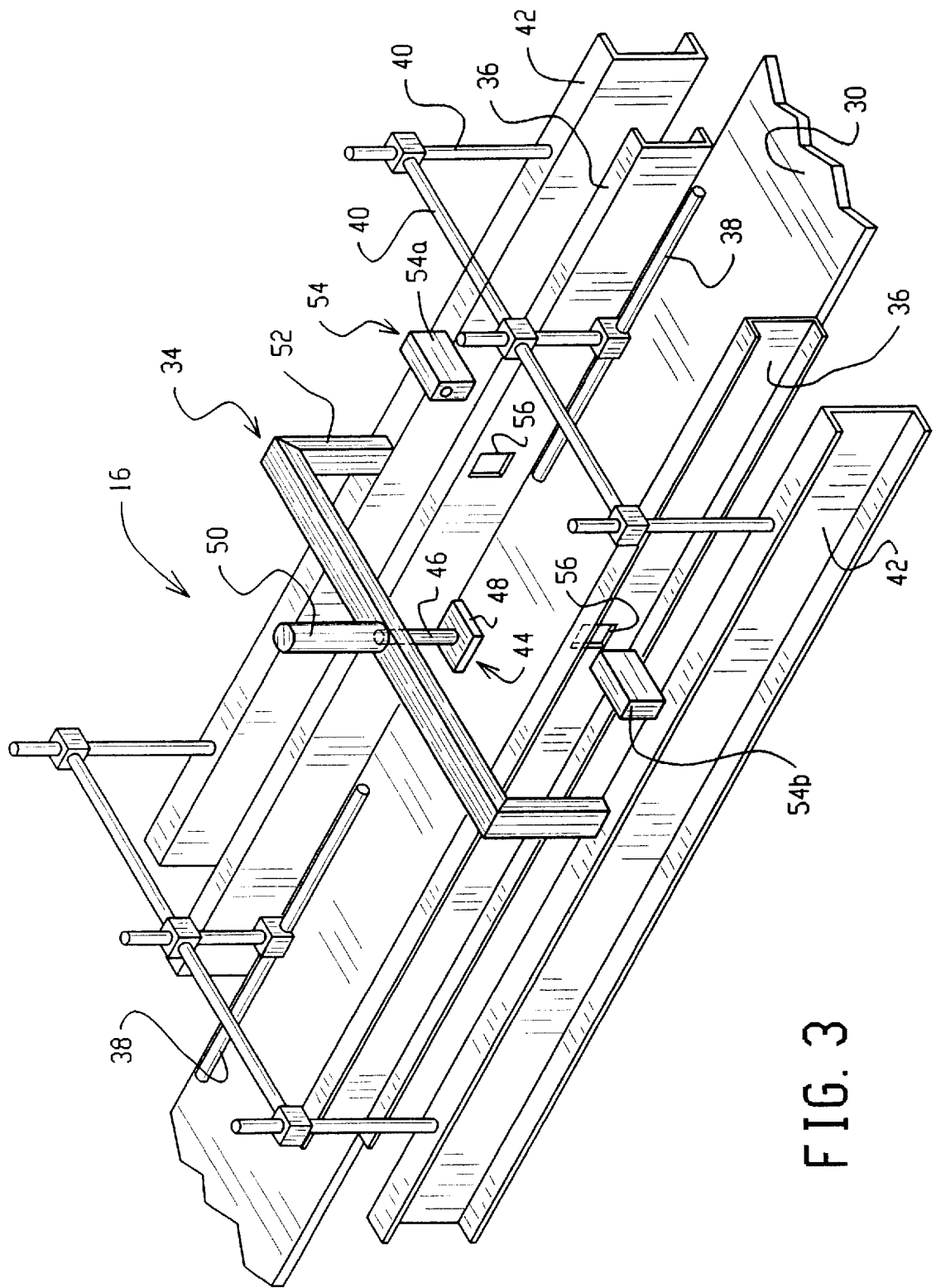
FIG. 3 is an illustration of a section of the conveyor system of FIG. 1 showing the stop gate assembly.

With reference to the drawings and initially to FIGS. 1 and 2, there is shown a cushion conversion system 8 including a cushioning conversion machine 10 having an pad-transferring assembly 12 positioned at its exit 13 for transferring the cushioning product, or pads 14, produced by the machine to a conveyor system 16 occupying the transitional zone 17 of the machine. The conveyor system 16 urges the pads away from the machine 10 while permitting the pads to be removed by an operator from any position on the conveyor for use in providing cushioning to a container.

The cushioning conversion machine 10 includes a frame 18 by which are supported the various components for converting stock material, such as kraft paper, to a strip of cushioning product and cutting the strip into sections, called pads. Such components include a stock supply assembly 19, a forming assembly 20 for forming the stock material into the strip of cushioning product 21, a feed assembly 22 for feeding stock material through the forming assembly and out the machine exit 13 to the pad-transferring assembly 12, and a cutting assembly 24 for cutting the strip of cushioning material into pads of a desired length. Preferably operation of the pad-transferring assembly 12, the feed assembly 22 and the cutting assembly 24 are controlled by a controller (shown schematically at 26), such as the controller described in co-owned U.S. patent application Ser. No. 08/279,149 which is incorporated herein by this reference.

During the conversion process, the forming assembly 20 causes the lateral edges of the stock material to roll inwardly to form a continuous strip having two lateral pillow-like portions and a central band therebetween. The feed assembly 22 performs a "pulling" function by drawing the continuous strip through the nip of two cooperating and opposed gears 27 thereby drawing stock material through the forming assembly 20 for a duration determined by the length of time that a feed motor 29 rotates the opposed gears. The feed assembly 22 additionally performs a "coining" or "connecting" function as the two opposed gears 27 coin the central band of the continuous strip as it passes therethrough to form a coined strip. As the coined strip travels downstream from the feed assembly 22, the cutting assembly 24 cuts the strip into sections or pads 14 of a desired length. These cut sections then preferably travel through a post-cutting constraining assembly (not shown) and exit to the pad-transferring assembly 12.

The pad-transferring assembly 12, as is more fully described in co-owned U.S. patent application Ser. No. 08/154,911 which is incorporated herein by this reference, cooperates with the conveyor system 16 to engage the leading edge of a pad 14 just prior to being cut by the cutting assembly 24 and to pull the pad away from the cutting assembly and the machine 10. Typically, the pad-transferring assembly 12 would include a belt spaced from the conveyor of the conveyor system 16 to gently compress and frictionally engage the pad 14 therebetween to transfer the pad from the machine exit 13 to the conveyor system to be further conveyed from the machine 10 for use by an operator.

Referring to FIGS. 1 through 4, the conveyor system 16 includes a continuous belt conveyor 30 extending between a pair of end rollers 32 located at distal ends of the conveyor system. The conveyor 30 may be one of many suitable types and finishes with a coefficient of friction between the conveyor and the pad so as to cause the pad to move with the conveyor while permitting the pad to slide relative to the conveyor without damage to the pad when the pad has reached the end of the conveyor or is otherwise prohibited from movement such as by another pad or by a stop gate assembly 34, as is described more fully below. The conveyor 30 is powered in a conventional manner by a conveyor motor, not shown, which may, for example, have a roller which frictionally engages the conveyor to cause linear movement of the conveyor or which may rotate one of the end rollers 32 to move the conveyor. A pad 14 transferred to the conveyor 30 by the pad-transferring assembly 12 will thus generally progress away from the machine 10 toward the pad stop 35 located at the end of the conveyor distal from the machine.

At either lateral side of the conveyor 30 and extending substantially the length of the conveyor is a guide rail 36. Positioned above the conveyor 30 are a number of hold-down rods 38 also running substantially the length of the conveyor with breaks in the vicinity of each stop gate assembly 34. The guide rails 36 and hold-down rods 38 maintain the pads in a generally ordered, single file arrangement on the conveyor 30. The guide rails 36 are held in position above the conveyor by connection with an overhead frame assembly 40 which is in turn supported on each side of the conveyor 30 by a pair of outer support rails 42.

Each stop gate assembly 34 includes a gate 44 comprised of a rod 46 terminating in a contact foot 48 and which is moveable between an upper or open position out of the way of the pads 14 as they move along the conveyor 30 and a lower or closed position in which the contact foot stops a pad from further movement with the conveyor. The position of the gate 44 is controlled by a pneumatic cylinder 50 within which one end of the rod 46 is disposed or through another similar means, such as a solenoid or motor. Each stop gate assembly 34 includes an overhead frame assembly 52 which supports the pneumatic cylinder 50 and is in turn supported at each side of the conveyor by the outer support rails 42. The stop gate assemblies 34 are preferably arranged relative to the end of the conveyor 30 and spaced relative to each other so that a number of pads fit in a single file order between the last stop gate assembly 34 and the ends of the conveyor and between the stop gate assemblies with a small gap between the last pad in the series of pads and the stop gate assembly.

Associated with and located downstream of each stop gate assembly 34 is a sensor 54 for sensing the presence of a stopped pad. The spacing of the sensor 54 from the associated stop gate assembly 34 is preferably such that upon the detection of a stopped pad, the stop gate 44 can close with the contact foot 48 positioned between successive pads on the conveyor, although the stop gate may close with a pad located below the contact foot. The sensor 54 is preferably located between the guide rails 36 and the outer support rails 42 and located adjacent openings 56 in the guide rails. The sensor may be implemented as a separate emitter 54*a* and receiver 54*b* located on opposite sides of the conveyor 30, as illustrated in the figures, or the emitter and receiver may be embodied in a single device with a retroreflector located opposite the single device. The sensor 54 preferably is a time delay photoelectric sensor which generates an electrical control signal upon the interruption of an optical signal by a pad for a predetermined period of time to ensure that the pad is stopped. An exemplary series of suitable photoelectric sensors is manufactured by Automatic Timing and Controls Company, Inc. of Prussia, Pa. and designated as series 7080. The signal generated by the sensor 54 is used to control the solenoid on the stop-gate assembly 34 through appropriate control circuitry not shown in the figures.

As shown in FIGS. 4A through 4D, a sensor 58, such as a photoelectric sensor similar to sensor 52 without a time delay, is located near the exit 13 of the cushioning conversion machine 10 just past the pad-transferring assembly 12 and senses the presence of a stopped pad 14 near the exit of the machine. The sensor 58 provides a control signal indicating the detection of pad to the machine 10, preferably the machine controller 26. The control signal from the sensor 58 may be analyzed with other control signals, such as a signal generated by a sensor (not shown) within the pad-transferring assembly 12 and other machine information, such as whether the machine is in a feed operation or a cutting operation, and appropriate action taken by the controller 26. For instance, if the controller 26 determines that the machine 10 is performing a feed operation, i.e., the feed motor 29 is running, and the sensor 58 has detected the presence of a pad 14 without interruption for a certain length of time, the controller may deactivate the feed motor to prevent further production of pads until the pad adjacent the sensor 58 has been conveyed past the sensor by the conveyor 30. In this manner the machine 10 can controllably produce pads only when there is space on the conveyor 30 for additional pads thereby decreasing the possibility of pads becoming jammed in the cutting or feed assemblies 24, 22, respectively, as a result of backpressure from previously formed pads.

In the absence of the stop gate assembly 34 and sensors 52 and 58, pads 14 will be continually produced by the machine 10 and transferred to the conveyor 30 by the pad transferring assembly 12 without regard to the number of pads on the conveyor, as shown in FIG. 5. In such a situation, when pads 14 are not removed from the conveyor 30 by an operator as the conveyor fills with pads, the leading pad 14*a* will contact the pad stop 35 at the end of the conveyor and pads will begin to accumulate behind the leading pad 14*a*. As pads 14 are added to the conveyor 30 but a corresponding number are not removed, the pads nearer the pad stop 35 will begin to nest and reorient themselves on the conveyor 30 as a result of the pressure from the series of pads 14 behind those pads as they are continually urged by the movement of the conveyor 30 away from the machine 10, as shown generally at 60. This nesting and reorientation of the pads on the conveyor makes it difficult for an operator to remove one pad at a time and may cause damage to the pads, such as the pad becoming unconnected or uncoined, upon the operator attempting to pull a pad from the conveyor. In many instances it may also be difficult to remove only one pad at a time from the conveyor and the operator may be forced to manually separate the pads thus slowing the process of the operator removing a pad from the conveyor and placing it in a container for packaging. Despite the presence of the hold down rods 38, the force of the accumulated pads as they continue to be urged towards the pad stop 35 may also cause the pads to slide over top one another or shingle, also making removal from the conveyor difficult and potentially damaging to the pad.

The present invention overcomes these problems through the use of the stop gate assembly 34 and sensors 52 and 58. Referring to FIGS. 4A–4D and initially to FIG. 4A there is shown a conveyor system 16 in a condition completely filled with pads. (In FIGS. 4A through 4D for ease of discussion, the stop gate assemblies 34 are shown as 34*a* and 34*b* with the stop gate 34*a* being closer to the pad stop 35.) With the conveyor filled with pads, the stop gate assemblies 34*a* and 34*b* are both in their closed conditions. Referring to the area 62 of the conveyor 30 there are shown three pads 14 aligned behind the leading pad 14*a* which is in contact with the pad stop 35. The third pad 14*b* aligned behind the leading pad 14*a* is stopped adjacent the sensor 54 downstream of the stop gate assembly 34*a*. As the sensor 54 will detect the presence of the stopped pad 14*b* it generates a control signal which causes the stop gate 34*a* to close. A series of pads thus begins to accumulate in the area 64 located between the stop gate assemblies 34*a* and 34*b*.

Once a number of pads 14 have accumulated in the area 64, the presence of a stopped pad will be detected by the sensor 54 immediately downstream of the stop gate assembly 34*b* which will thus generate a control signal which causes the stop gate 34*b* to close. The pads 14 will then accumulate behind the stop gate assembly 34*b* in the area 66 between the stop gate assembly 34*b* and the machine 10. Once a number of pads have accumulated in this area 66 and have backed up so that the last pad in the series is adjacent the sensor 58, the sensor will detect the presence of the stopped pad and inform the controller 26 of the machine 10 of the presence of the stopped pad and the machine 10 may then take appropriate action to stop operation of the feed assembly 22 until there is sufficient room on the conveyor 30 for additional pads 14. Since only a limited number of pads 14 may accumulate in any given area 62, 64, 66 of the conveyor 30, the accumulated pressure of the pads as they are urged away from the machine 10 by the conveyor 30 is not sufficient to cause the pads to become misaligned on the conveyor 30, to become nested or to begin to stack or shingle. Consequently, the pads 14 are presented in an ordered fashion and are easy to remove from the conveyor 30 by an operator and also do not jam the machine 10.

Figure 4A:
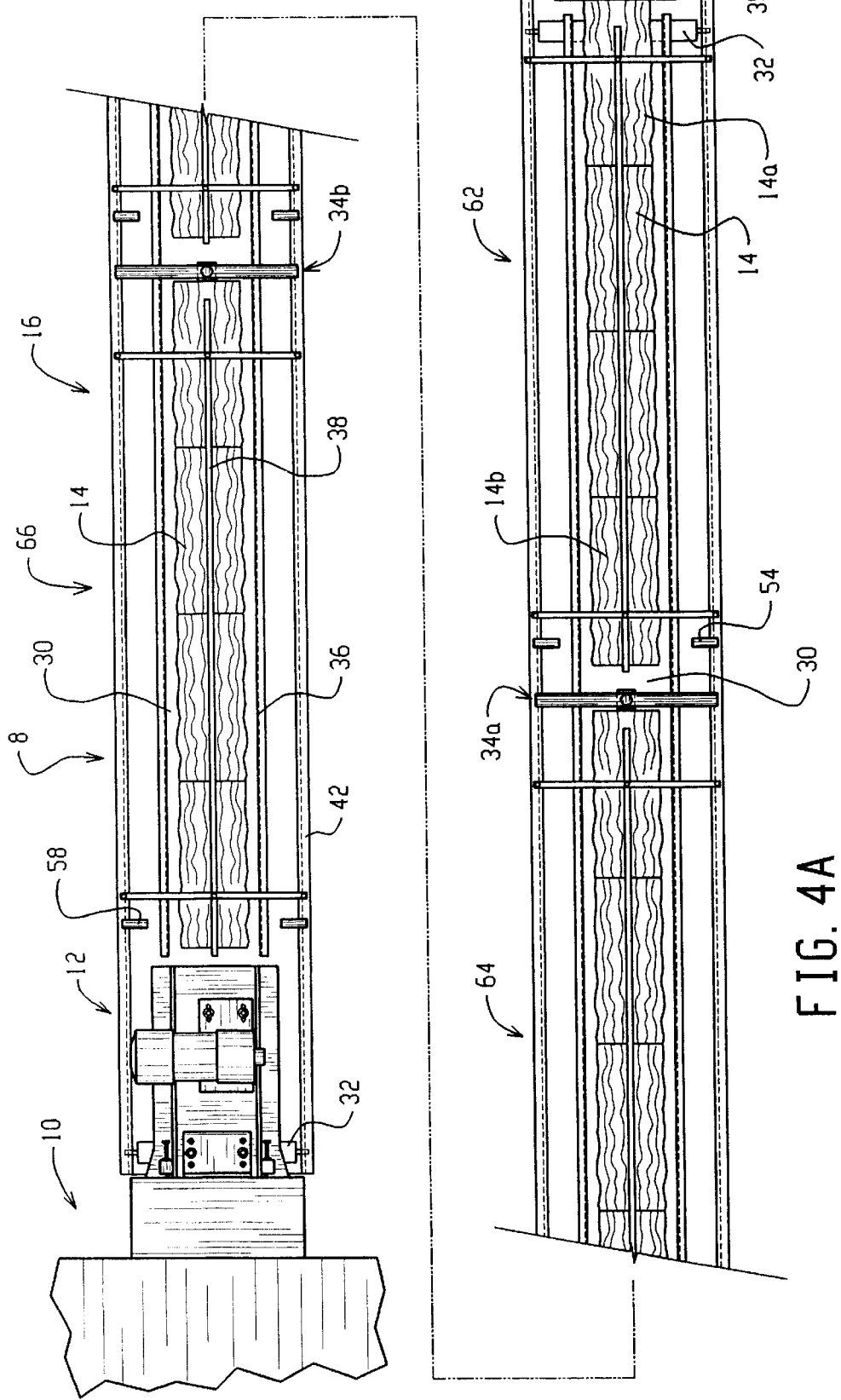
Figure 4B:
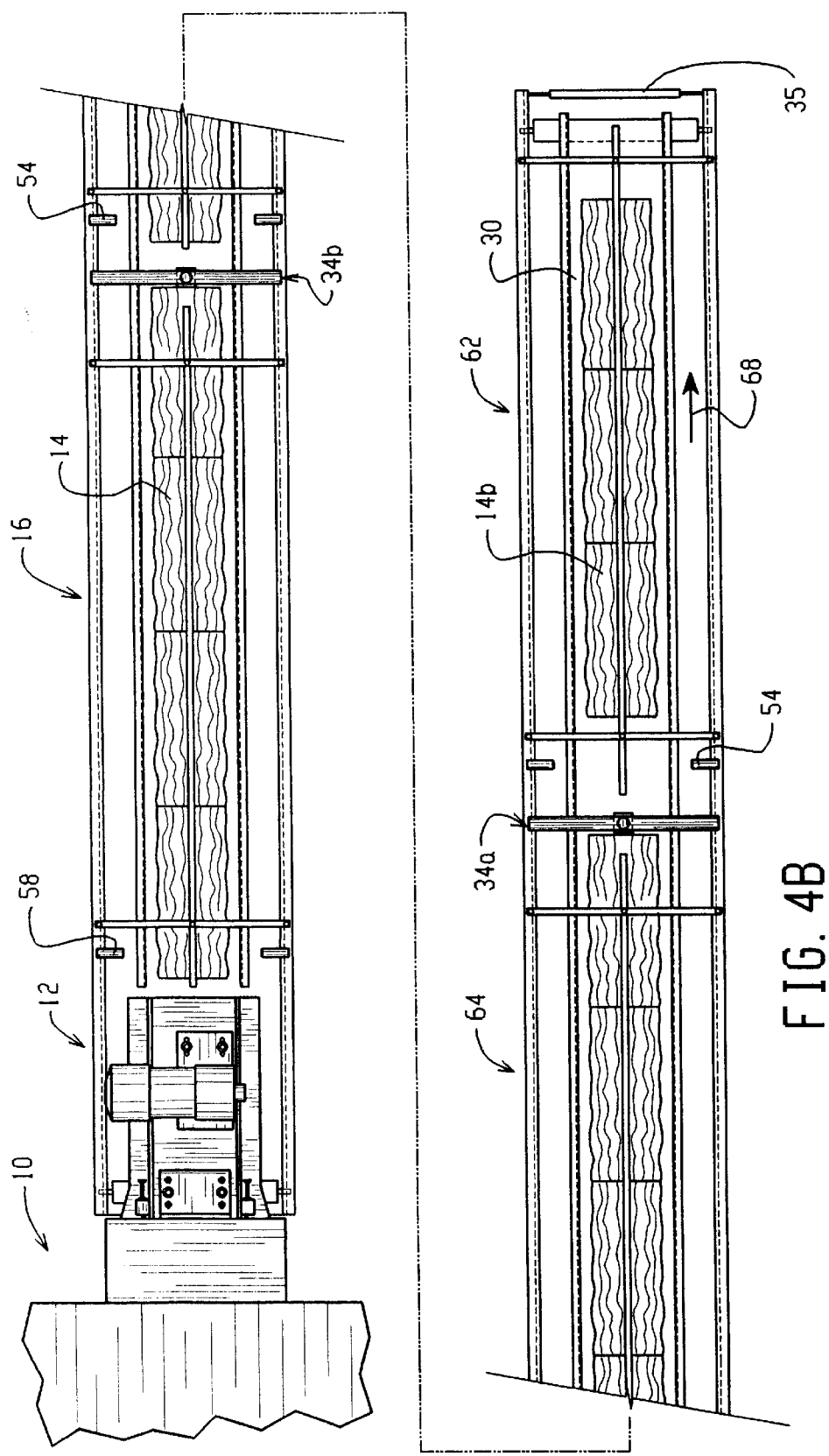
Figure 4C:
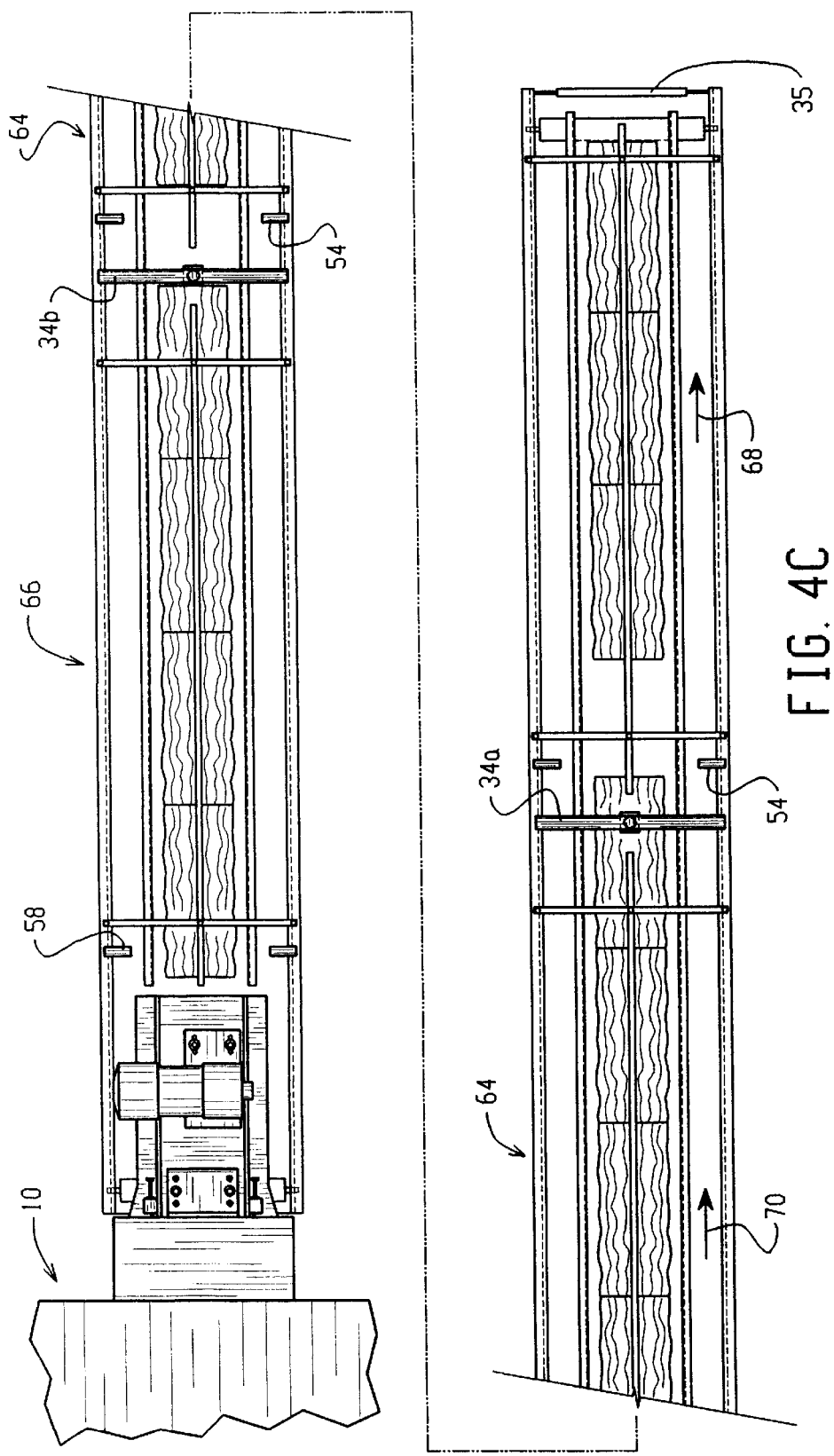

When a pad is removed from the conveyor 30, such as pad 14a from area 62, the pads in that area will then progress along the conveyor 30 away from the machine 10 as indicated by arrow 68 in FIG. 4B. As the pads progress away from the machine 10 the pad 14b will move away from the sensor 54 downstream of the stop gate assembly 34a, thus causing the stop gate to open. When the stop gate assembly 34a opens, as shown in FIG. 4C, the pads 14 accumulated in the area 64 will also begin to progress away from the machine 10 as indicated by arrow 70. As the pads 14 in the area 64 progress, the trailing pad will move away from the sensor 54 downstream of the stop gate assembly 34b, thus causing stop gate assembly 34b to open, as shown in FIG. 4D.

Once the stop gate 34b has opened, the pads accumulated in the area 66 will progress away from the machine 10, as shown by arrow 72, and the last pad in the accumulated series of pads will be conveyed away from the sensor 58. When the sensor 58 detects that there is an opening on the conveyor 30, the controller 26 will cause the feed assembly 22 to create another pad which will be transferred to the conveyor 30 by the pad-transferring assembly 12 as indicated by arrow 74. This process will continue as pads are removed from the conveyor 30. It is noted that pads do not have to be removed from the area 62 alone, but can be removed from the other areas of the conveyor such as areas 64 or 66 whereupon the same process as described above will occur upstream of the removed pad. In the event that a period of time progresses where no pads are removed from the conveyor 30, the conveyor will again begin to fill with accumulated pads as is indicated in FIG. 4A.

Figure 6:
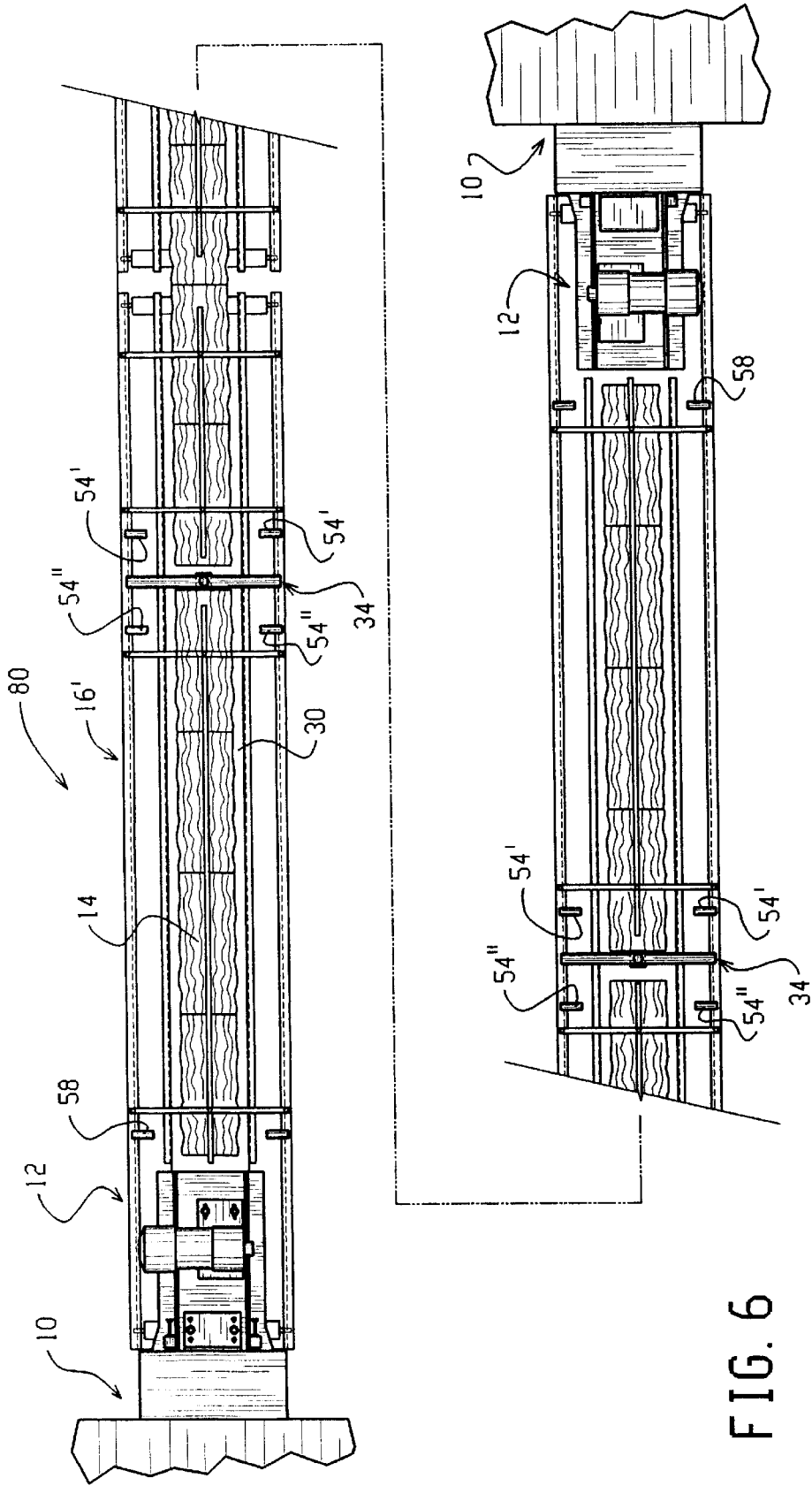
FIG. 6 is a top view of an alternate cushioning conversion system including a reversible conveyor with a cushioning conversion machine located at either end of the conveyor.
Figure 7:
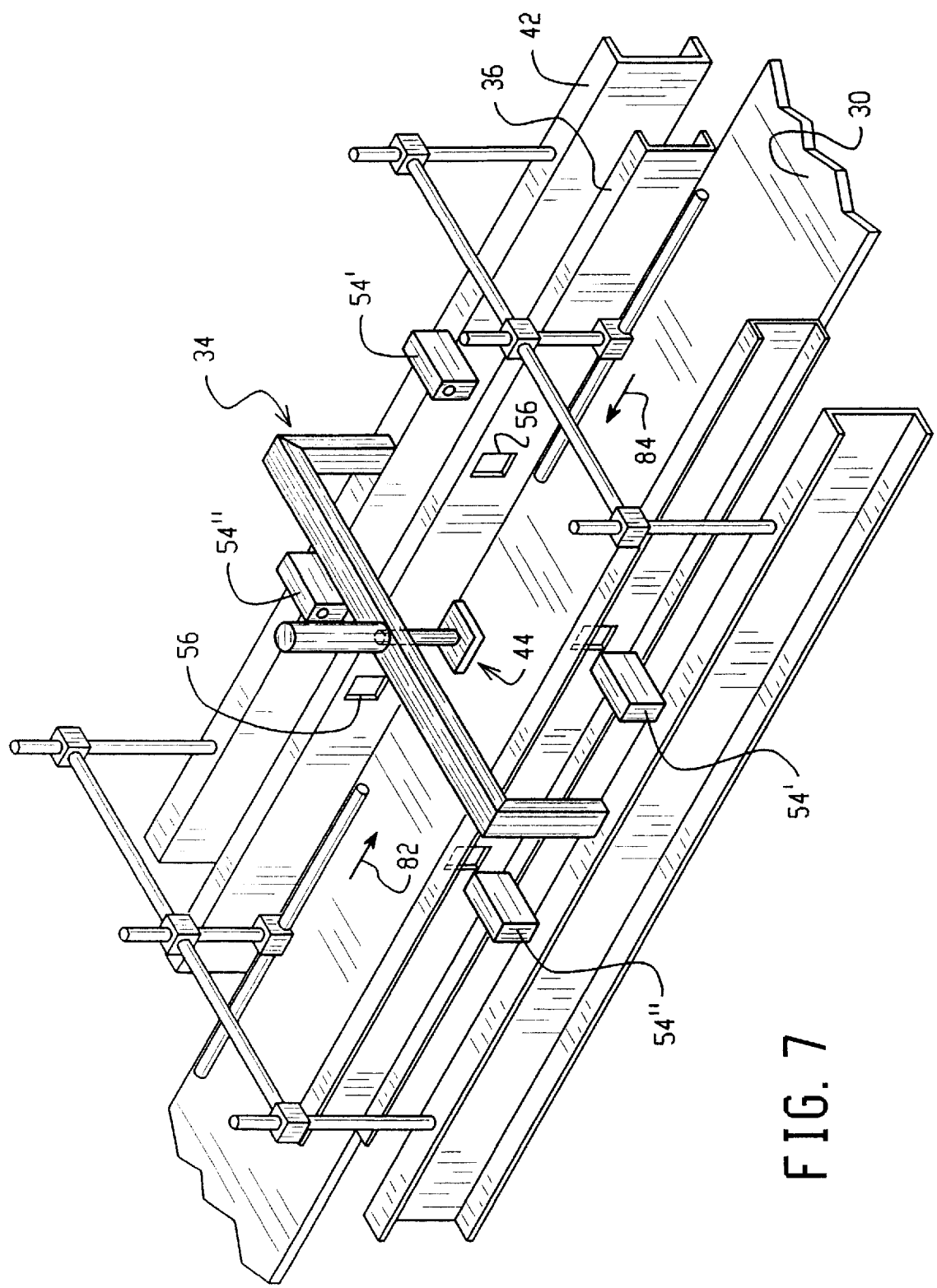
FIG. 7 is a view of a section of the conveyor system of FIG. 5 showing the area of the stop gate assembly.

Referring now to FIGS. 6 and 7 there is shown an alternate embodiment of a cushioning conversion system 80 including a reversible conveyor system 16' with a cushioning conversion machine 10 and an associated pad-transferring assembly 12 located at either end of the conveyor system for producing pads and transferring them to the conveyor system for conveyance to an operator. The conveyor system 16' is similar to the conveyor system 16 described above with the exception that the conveyor 30 is reversible and that each of the stop gate assemblies 34 includes a pair of sensors 54' and 54" associated therewith. In this embodiment, one machine 10 operates or is active at a time with the conveyor 30 of the conveyor system 16' moving in a direction to convey the pads 14 produced by the active machine in a direction away from that machine. Control of the individual stop gate assemblies 34 is then in accordance with the control signal generated by the sensor 54' located downstream from the stop gate assembly relative to the direction of conveyance of the conveyor 30. For example, when the cushioning conversion machine 10 shown on the left side of FIG. 6 is active and the conveyor 30 is conveying pads away from the machine in the direction of arrow 82 as shown in FIG. 7, or to the right, the stop gate assembly 34 will be controlled in accordance with the control signals generated by the sensors 54'. Alternatively, when the machine 10 shown on the right side of FIG. 6 is active and the conveyor 30 is conveying pads away from the machine in the direction of arrow 84 shown in FIG. 7, or to the left, the stop gate assembly 34 would be controlled in accordance with the control signals generated by the sensor 54". The operation of the conveyor system 16' would then be basically as described above relatively to FIGS. 4A–4D. In this manner, if one of the cushioning conversion machines 10 becomes damaged, jammed or must be deactivated for maintenance or for the resupply of paper, then the other machine will be activated and will produce the required pads, and the conveyor 30 will be reversed accordingly. Reversal of the conveyor 30 and selection of the active cushioning conversion machine 10 may be automated or manual as desired in a particular application.

While the cushioning conversion system and conveyor system have been described relative to a number of specific embodiments, it will be readily apparent that the present invention has a wide range of applications in many types or configurations of cushioning conversion machines and conveyors.

What is claimed is:

1. A cushioning conversion system comprising a cushioning conversion machine, an accumulator, and a controller;

the cushioning conversion machine including a conversion assembly which sequentially converts a sheet-like stock material into a plurality of cushioning pads;

the accumulator being positioned to receive the plurality of cushioning pads one-by-one in a sequential order so as to fill the accumulator being to a desired full state when a desired number of the plurality of cushioning pads are adjacently positioned in the accumulator;

the controller including an accumulator-full sensor which senses when the accumulator has reached the desired full state; and the controller activating the cushioning conversion machine when the sensor senses that the accumulator is not in said desired full state and deactivating the cushioning conversion machine when the sensor senses that the accumulator has reached said desired full state to systematically replace the cushioning pads one-by-one in the accumulator as they are removed therefrom.

2. A method of using the cushioning conversion system of claim 1, said method comprising the steps of:

converting the sheet-like stock material into the plurality of cushioning pads by activating the cushioning conversion machine;

accumulating the plurality of cushioning pads in the accumulator in a sequential order until the desired number of the plurality of cushioning pads are contained in the accumulator whereby the accumulator-full sensor will sense that the accumulator has reached the desired full state;

deactivating the cushioning conversion machine upon the accumulator-full sensor sensing that the accumulator has reached the desired full state;

removing one of the plurality of cushioning pads from the accumulator whereby the accumulator-full sensor will sense that the accumulator is no longer in said desired full state;

activating the cushioning conversion machine upon the accumulator-full sensor sensing that the accumulator is no longer in said desired full state to convert the sheet-like stock material into a replacement cushioning pad;

adding the replacement cushioning pad to the accumulator whereby the accumulator-full sensor will sense that the accumulator is again in the desired full state;

deactivating the cushioning conversion machine upon the accumulator-full sensor sensing that the accumulator is again the desired full state; and repeating the last four removing, activating, adding and deactivating steps.

3. A cushioning conversion system as set forth in claim 1 wherein the accumulator is a conveyor which is positioned to receive the plurality of cushioning pads in a horizontal sequential order.

4. A cushioning conversion system as set forth in claim 3, wherein the conveyor includes a substantially horizontal conveying surface and a drive which moves the surface in a first direction away from the cushioning conversion machine, the surface having a coefficient of friction relative to the cushioning pads such that the cushioning pads will move with the surface in absence of a restriction preventing movement.

5. A cushioning conversion system as set forth in claim 4, wherein:

the conveyor further comprises a gate defining an upstream end of a conveyor zone which fits a plurality of cushioning pads;

the gate is movable between an open position whereat cushioning pads on the conveying surface upstream of the gate may be conveyed into the conveyor zone and a closed position whereat cushioning pads upstream of the gate are blocked from entering the conveyor zone;

the controller including a zone-full sensor which senses when there is insufficient space in the zone to fit another cushioning pad; and the controller moving the gate to the closed position when the zone-full sensor senses that there is insufficient space in the conveyor zone to fit another cushioning pad.

6. A cushioning conversion system as set forth in claim 4, wherein:

the cushioning conversion machine is a first cushioning conversion machine positioned at a first end of the conveying surface so that the conveying surface may receive in an sequential order the plurality of cushioning pads converted by the first cushioning conversion machine;

the accumulator-full sensor is a first conveyor-full sensor which senses when there is insufficient space on the conveying surface to fit another cushioning pad when the conveyor drive is moving the conveying surface in the first direction away from the first cushioning conversion machine;

the cushioning conversion system further comprises a second cushioning conversion machine including a conversion assembly which sequentially converts a sheet-like stock material into a plurality of cushioning pads;

the second cushioning conversion machine is positioned at a second end of the conveying surface so that the conveying surface may receive in an sequential order the plurality of cushioning pads converted by the second cushioning conversion machine;

the conveyor's drive is selectively reversible to move the conveying surface in a second direction away from the second cushioning conversion machine;

the controller includes a second conveyor-full sensor which senses when there is insufficient space on the conveying surface to fit another cushioning pad when the conveyor's drive is moving the conveying surface in the second direction away from the second cushioning conversion machine;

the controller deactivates the first cushioning conversion machine when conveyor drive is moving the conveying surface in the first downstream direction and the first conveyor-full sensor senses that there is insufficient space on the conveying surface to fit another cushioning pad; and the controller deactivates the second cushioning conversion machine when drive is moving the conveying surface in the second downstream direction and the second conveyor-full sensor senses that there is insufficient space on the conveying surface to fit another cushioning pad.

7. A cushioning conversion system as set forth in claim 6, wherein:

the conveyor-full sensors each also sense when there is sufficient space on the conveying surface to fit another cushioning pad;

the controller activates the first cushioning conversion machine when the conveyor drive is moving the conveying surface in the first direction away from the first cushioning conversion machine and the first conveyor-full sensor senses that there is sufficient space on the conveying surface to fit another cushioning pad;

the controller activates the second cushioning conversion machine when conveyor drive is moving the conveying surface in the second direction away from the second cushioning conversion machine and the second conveyor-full sensor senses that there is sufficient space on the conveying surface to fit another cushioning pad.

* * * * *